C. KIRCH.
COMBINATION BUMPER AND FENDER.
APPLICATION FILED APR. 3, 1922.

1,438,533.

Patented Dec. 12, 1922.

INVENTOR:
CHARLES. KIRCH,
BY
Graham & Hurris
ATTORNEYS.

Patented Dec. 12, 1922.

1,438,533

UNITED STATES PATENT OFFICE.

CHARLES KIRCH, OF PASADENA, CALIFORNIA.

COMBINATION BUMPER AND FENDER.

Application filed April 3, 1922. Serial No. 548,933.

*To all whom it may concern:*

Be it known that I, CHARLES KIRCH, a citizen of the United States, residing at Pasadena, in the county of Los Angeles, State of California, have invented a new and useful Combination Bumper and Fender, of which the following is a specification.

My invention relates to automobiles and relates particularly to a safety device for preventing a person or object which has been struck by the automobile from getting under the wheels or the body thereof.

It is the principal object of my invention to provide a combination bumper and fender which is normally maintained in a retracted position and in such position has the appearance of an ordinary bumper, but upon striking a person or object is adapted to extend a fender across the front of the automobile, this fender providing a resiliently maintained apron for catching the object struck, carrying it along until the machine is brought to a full stop, thus preventing the object from being run over.

Other objects and advantages will become evident hereinafter.

Referring to the drawing, which is for illustrative purposes only,

Figure 1:
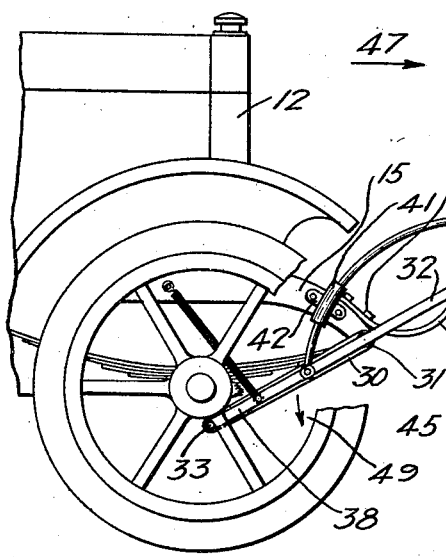
Fig. 1 is an elevational view showing my invention mounted in retracted position upon the front of an automobile.

As shown in the drawing, my invention provides a housing 11 mounted across the front of an automobile 12 by means of flat spring members 13 which are secured by bolts 14 to the chassis extensions 15. This housing 11 is open along the bottom and supports therewithin a spring actuated roller 18 upon which an apron 19 is wound. The free end 20 of the apron 19 is attached to a bar 21 having a pair of rubber tired wheels 22 mounted upon the ends thereof. The bar 21 is slightly longer than the housing 11 so that when it is in its normal position of rest in grooves 24 provided in the ends 25 of the housing, the wheels 22 mounted upon the ends thereof will be disposed outside the housing, as shown. A pair of link bars 30 are pivoted to the extension 15 at 31 and arms 32 are pivoted to the lower ends of the bars 30 at 33. The springs 35 connected at 36 to the bars 30 and at 37 to the chassis structure normally maintain the link bars in the withdrawn position shown at 38 in Fig. 1, and the arms 32 are normally held in the position in which they are shown in Fig. 1 due to the winding of the apron 19 upon the spring actuated roller 18. It will be perceived that in this position the arms 30 and 32 are inconspicuous and do not detract from the general apearance of the automobile upon which the device is placed.

Figure 2:
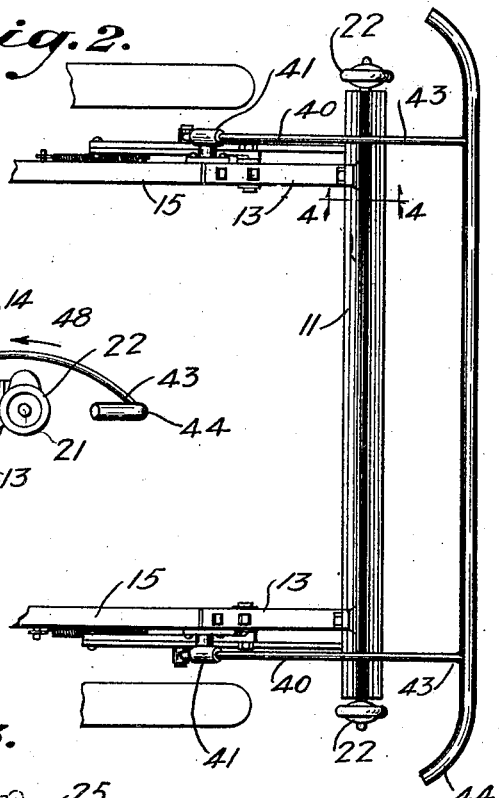
Fig. 2 is a plan view of the fender installation in retracted position.

A curved bar 40 located upon each side of the chassis extensions 15 is each slidably contained in a sleeve 41 which is pivoted to the extension 15 by means of a bracket 42. The outer ends 43 of the curved bars 40 support a cross bar 44 which, as shown in Figs. 1 and 2, is maintained in a position a little forward of the housing 11. The inner ends of the bars 40 are pivoted to arms 32.

Figure 3:
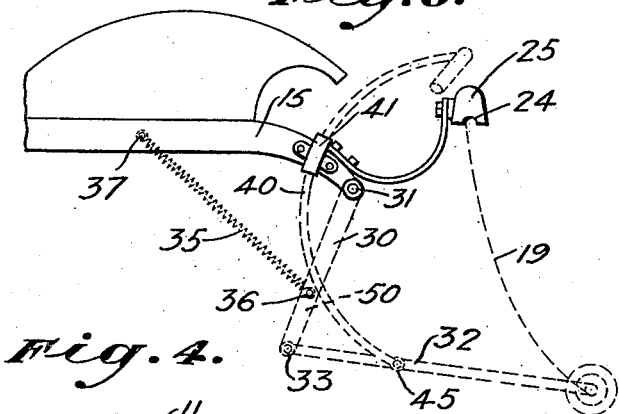
Fig. 3 is an elevation showing the device extended.
Figure 4:
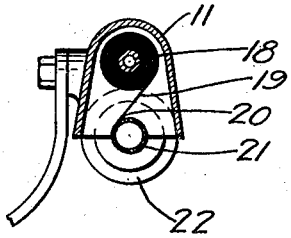
Fig. 4 is a section taken substantially upon a plane represented by the line 4—4 of Fig. 2.

Considering that when the automobile is travelling in the forward direction indicated by the arrow 47, a person or object is struck by the cross bar 44, a reactive force will be exerted upon the curved arms 40 in the direction of the arrow 48 causing them to move downwardly through the sleeves 41 and exert a force upon the arms 32 in the direction of the arrow 49. A continuance in the movement of the bars 40 forces the arms 32 from the position in which they are shown in Fig. 1 to the extended position shown in Fig. 3, at the same time swinging the arms 30 forwardly against the action of the springs 35 into the position indicated at 50 in Fig. 3. The downward movement of the arms 32 unrolls the apron, which is preferably canvas, into the position indicated in Fig. 3 thus providing a fender for preventing the person or the object struck from being run over by the automobile.

It will be perceived that my invention returns to the closed or retracted position after the force is removed from the cross bar and curved bars 40 without requiring manual attention owing to the action of the spring 35 and the spring actuated roller 18 which exert forces upon the device which tend to hold it normally in this retracted position.

I claim as my invention:

1. In a fender for automobiles, the combination of: a holder adapted to be mounted across the front of an automobile; a spring rotated roller mounted in said holder; a pair of link bars, one pivoted at each side of the front of the automobile; an arm pivoted to the free end of each of said bars, said arms being forwardly extended and attached to the free edge of said apron; a spring for normally holding each of said bars in a retracted position; and means for extending said arms so as to unroll said curtain into a receptive position before the automobile.

2. In a fender for automobiles, the combination of: a holder adapted to be mounted across the front of an automobile; a spring rotated roller mounted in said holder; a pair of link bars, one pivoted at each side of the front of the automobile; an arm pivoted to the free end of each of said bars, said arms being forwardly extended and attached to the free edge of said apron; a spring for normally holding each of said bars in a retracted position; a slide block pivotally sustained adjacent to each of said bars; and a curved bar slidably maintained in each of said slide blocks, the forward ends of said curved bars supporting a cross bar and the rearward ends thereof being so connected to said arms that the said arms will be moved downwardly, unrolling said apron, and the link bars will be swung forwardly so as to project the lower end of the apron substantially as described.

3. A fender for automobiles or other vehicles comprising: an apron, a cross bar so mounted that it will strike against a stationary object in the path of the vehicle; means for holding said apron in a retracted position; and means by which said cross bar pulls said apron into a position to catch any object striking said bar.

4. A fender for automobiles or other vehicles comprising: an apron; a cross bar so mounted that it will strike against a stationary object in the path of the vehicle; means for holding said apron in a retracted position; and means by which said cross bar acts against said holding means for pulling said apron into an operative position.

In testimony whereof, I have hereunto set my hand at Los Angeles, California, this 24th day of March, 1922.

CHARLES KIRCH.